United States Patent Office 3,719,635
Patented Mar. 6, 1973

3,719,635
METAL HYDROCARBONOXIDES IN ROOM TEMPERATURE VULCANIZABLE SILICONE ELASTOMERS
William H. Clark, Mount Pleasant, Thomas W. Greenlee, Midland, and Louis H. Toporcer, Ingersol Township, Midland County, Mich., assignors to Dow Corning Corporation, Midland, Mich.
No Drawing. Filed June 18, 1971, Ser. No. 154,648
Int. Cl. C08f 11/04
U.S. Cl. 260—46.5 G 9 Claims

ABSTRACT OF THE DISCLOSURE

One package room temperature vulcanizable silicone elastomers with improved adhesion to metal surfaces are mixtures of polydiorganosiloxanes with hydroxyl, alkoxy or acetoxy endblocking, a silicon compound containing alkoxy or acetoxy functionality, a curing catalyst and a metal hydrocarbonoxide, such as $Fe(OR^{iv})_3$, $V(OR^v)_3$, $Co(OR^v)_2$, $MoO_2(OR^v)_2$, $Zn(OR^v)_2$, $Ce(OR^v)_3$ and $Al(OCH_2CH_3)_3$ where $R^{iv}$ is ethyl, propyl, butyl or phenyl and $R^v$ is ethyl, propyl or butyl.

---

This invention relates to room temperature vulcanizable silicone elastomers which have improved adhesion to metal surfaces.

A variety of techniques have been used to adhere silicone rubber to substrates such as metals, which include using primers, adhesive compositions and additives to the room temperature vulcanizable silicone elastomer composition. Of the three techniques recited above, the use of additives in the room temperature vulcanizable silicone elastomer composition is the most desirable, since the user is required to handle only one composition.

It is therefore an object of this invention to provide a room temperature vulcanizable silicone elastomer composition which contains an additive which increases the adhesion to substrates such as metal surfaces without the use of primers or adhesive compositions.

This invention relates to a room temperature vulcanizable silicone elastomer composition stable in the absence of moisture but curable upon exposure to moisture consisting essentially of (A) 100 parts by weight of a polydiorganosiloxane having a viscosity of from 1000 to 100,000 cs. at 25° C. and having endblocking selected from the group consisting of hydroxyls and siloxy units of the formula $R_nX_3-nSiO_{0.5}$ where R is selected from the group consisting of methyl, ethyl, 3,3,3-trifluoropropyl, vinyl and phenyl, X is selected from the group consisting of alkoxy radicals having from 1 to 6 carbon atoms and acetoxy radicals, and $n$ is an integer of from 0 to 1 inclusive, the organic groups of the polydiorganosiloxane are the same as defined for R wherein at least 50 percent of the organic groups are methyl, (B) from 0.1 to 15 parts by weight of a silicon compound selected from the group consisting of

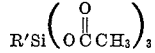

$R'Si(OR'')_3$, $Si(OR''')_4$, and partial hydrolyzates of $Si(OR''')_4$ where R' is selected from the group consisting of alkyl having from 1 to 6 carbon atoms, vinyl, 3,3,3-trifluoropropyl and phenyl, R'' is an alkyl having from 1 to 6 carbon atoms and R''' is an alkyl having from 2 to 6 carbon atoms, where

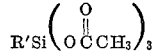

is used only when (A) has hydroxyl endblocking or X is acetoxy, (C) a curing catalyst for the composition and (D) from 0.01 to 2 parts by weight inclusive metal in the form of a metal hydrocarbonoxide selected from the group consisting of $Fe(OR^{iv})_3$, $V(OR^v)_3$, $Co(OR^v)_2$, $MoO_2(OR^v)_2$, $Zn(OR^v)_2$, $Ce(OR^v)_3$ and $Al(OCH_2CH_3)_3$ wherein $R^{iv}$ is selected from the group consisting of ethyl, normal propyl, normal butyl and phenyl and $R^v$ is selected from the group consisting of ethyl, normal propyl and normal butyl.

The room temperature vulcanizable silicone elastomer compositions of the present invention are known as one package or one component compositions. Only one package is required, since all the ingredients can be mixed and stored in one container in the absence of moisture without curing.

The room temperature vulcanizable silicone elastomer compositions of the present invention are well known in the art if the presence of the metal hydrocarbonoxide is excluded and are available commercially.

The polydiorganosiloxane can have a viscosity of from 1000 to 100,000 cs. at 25° C., preferably from 1000 to 50,000 cs. at 25° C. The organic radicals can be methyl, ethyl, phenyl, vinyl and 3,3,3-trifluoropropyl where at least 50 percent of the organic radicals are methyl. The polydiorganosiloxanes can be illustrated by polydimethylsiloxane, polymethyl-3,3,3-trifluoropropylsiloxane, polyethylmethylsiloxane, polydiethylsiloxane, and polydiorganosiloxanes which are copolymers of two or more units of dimethylsiloxane units, diphenylsiloxane units, methylphenylsiloxane units, diethylsiloxane units, methylvinylsiloxane units and 3,3,3-trifluoropropylmethylsiloxane units. Mixtures and blends of polydiorganosiloxanes can also be used.

The polydiorganosiloxanes can be endblocked with hydroxyl radicals, or siloxy radicals of the formula $R_nX_3-nSiO_{0.5}$ where $n$ is 0 or 1, R is methyl, ethyl, vinyl, phenyl or 3,3,3-trifluoropropyl and X is an alkoxy radical having from 1 to 6 carbon atoms such as methoxy, ethoxy, propoxy, isopropoxy, butoxy, pentoxy and hexoxy or acetoxy. The alkoxy endblocked polydiorganosiloxanes are well known in the art as illustrated by U.S. Pat. No. 3,161,614, issued Dec. 15, 1964, to Brown et al. which is hereby incorporated by reference. The acetoxy endblocked polydiorganosiloxanes are well known in the art as illustrated by U.S. Pat. No. 3,035,016, issued May 15, 1962, to Bruner which is hereby incorporated by reference.

The silicon compound (B) is an acetoxy silane when X is acetoxy or hydroxyl and an alkoxy silicon compound when X is alkoxy. The acetoxy silanes have a formula

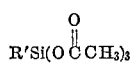

where R' is an alkyl of 1 to 6 carbon atoms, vinyl, phenyl or 3,3,3-trifluoropropyl. The acetoxy silanes can be illustrated by methyltriacetoxysilane, vinyltriacetoxysilane, phenyltriacetoxysilane, 3,3,3 - trifluoropropyltriacetoxysilane and ethyltriacetoxysilane. The acetoxysilanes are further illustrated by U.S. Pat. No. 3,035,016 cited above, and by U.S. Pat. No. 3,133,891, issued May 19, 1964, to Ceyzeriat which is hereby incorporated by reference.

The alkoxy silicon compounds can be illustrated by $R'Si(OR'')_3$, $Si(OR''')_4$ and partial hydrolyzates of $Si(OR''')_4$ where R' is defined above and R'' is an alkyl radical of 1 to 6 carbon atoms such as methyl, ethyl, n-propyl, butyl, isopropyl, pentyl and hexyl and R''' is an alkyl radical of 2 to 6 carbon atoms such as ethyl, n-propyl, isopropyl, butyl, pentyl and hexyl.

The $R'Si(OR'')_3$ can be illustrated by methyltrimethoxysilane, ethyltrimethoxysilane, ethyltriethoxysilane, methyltributoxysilane, methyltrihexoxysilane, ethyltriisopropoxysilane, propyltrimethoxysilane, butyltrimethoxysilane, pentyltrimethoxysilane, vinyltrimethoxysilane, hexyltrimethoxysilane, phenyltrimethoxysilane, vinyltriethoxysilane, phenyltriethoxysilane, isopropyltriethoxysilane, pentyltriphentoxysilane and butyltriethoxysilane. The $Si(OR''')_4$ can be illustrated by ethylorthosilicate, n-propylorthosilicate, amylorthosilicate, diethyldipropylorthosilicate and hexylorthosilicate. The partial hydrolyzates of $Si(OR''')_4$ can be illustrated by alkylpolysilicates such as ethylpolysilicate, n-propylpolysilicate, secondary amylpolysilicate, isopropylpolysilicate and n-butylpolysilicate. The alkoxy silicon compounds are well known in the art as illustrated by U.S. Pat. No. 3,294,739 issued Dec. 27, 1966 to Weyenberg and U.S. Pat. No. 3,334,067, issued Aug. 1, 1967, to Weyenberg which patents are hereby incorporated by reference.

The acetoxy silanes and alkoxy silicon compounds can be present in amounts of from 0.1 to 15 parts by weight per 100 parts by weight of the polydiorganosiloxane, preferably from 1 to 10 parts by weight per 100 parts by weight of the polydiorganosiloxane.

The curing catalyst for the room temperature vulcanizable silicone elastomer compositions of this invention can be those which are well known in the prior art such as described in the patents cited above and which have been incorporated by reference. The curing catalyst can be illustrated by metal salts of carboxylic acids such as lead 2-ethylhexoate, dibutyltin diacetate, dibutyltin di-2-ethylhexoate, dibutyltin dilaurate, butyltin tri-2-ethylhexoate, iron 2-ethylhexoate, cobalt 2-ethylhexoate, manganese 2-ethylhexoate, zinc 2-ethylhexoate, antimony octoate, bismuth naphthenate, tin oleate, tin butyrate, zinc naphthenate, stannous octoate, tin naphthenate, zirconium octoate, zinc stearate and titanium naphthenate: titanium esters such as tetrabutyltitanate, tetra-2-ethylhexyltitanate, tetraphenyltitanate, tetraoctadecyltitanate, triethanolaminetitanate, octyleneglycoltitanate and bis-acetylacetonyldiisopropyltitanate; organosiloxytitanium compounds such as $[(CH_3)_3SiO]_4Ti$, $$[(CH_3)_3SiO]_2Ti[OCH(CH_3)_2]_2$$

and

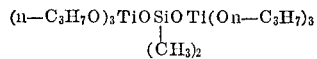

amines such as hexylamine, dodecylamine; amine salts such as hexylamineacetate, dodecylamine phosphate and quaternary amine salts such as benzyltrimethylammonium acetate. These and other curing catalysts are defined in the references. The preferred curing catalyst for the acetoxy containing compositions are the tin salts and for the alkoxy containing compositions are the titanium compounds. The curing catalysts can be present in catalytic amounts, preferably from 0.01 to 10 parts by weight per 100 parts by weight of the polydiorganosiloxane and a particularly useful range is from 0.05 to 5 parts by weight per 100 parts by weight of the polydiorganosiloxane.

Additional details with respect to ingredients and methods of combining the ingredients can be found in the patents incorporated by reference above and in addition to U.S. Pat. No. 3,061,575 by Russell, U.S. Pat. No. 3,077,465 by Bruner and U.S. Pat. No. 3,274,145 by Dupree which are hereby incorporated by reference.

The ingredient which enhances the adhesion of the room temperature vulcanizable silicone elastomer to metal is a metal hydrocarbonoxide. The metal hydrocarbonoxide is added to the composition in amounts sufficient to provide from 0.01 to 2 parts by weight of metal per 100 parts by weight of hydroxyl endblocked polydiorganosiloxane, preferably from 0.02 to 1 part by weight metal is present. The metal hydrocarbonoxides which are operative in the present invention are $Fe(OR)_3$, $V(OR')_3$, $Co(OR')_2$, $MoO_2(OR')_2$, $Zn(OR')_2$, $Ce(OR')_3$, and $Al(OCH_2CH_3)_3$ where R is ethyl, normal propyl, normal butyl or phenyl and R' is ethyl, normal propyl or normal butyl. Examples of the metal hydrocarbonoxide include,

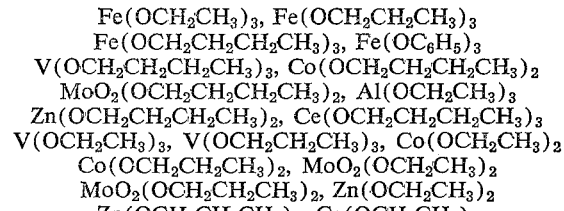

and $$Ce(OCH_2CH_3)_3$$

These metal hydrocarbonoxides are known in the art, are available commercially or can be prepared by known methods. The best method for preparing the metal hydrocarbonoxides was to mix the alcohol of the desired hydrocarbonoxide with sodium to form the sodium hydrocarbonoxide and then add the corresponding metal chloride to the sodium hydrocarbonoxide in a solvent, preferably the alcohol corresponding to the hydrocarbonoxide.

The room temperature vulcanizable silicone elastomers of this invention can also contain fillers and additives which are well known in the art as described in the patents incorporated herein by reference.

The room temperature vulcanizable silicone elastomer is prepared by mixing all the ingredients. The method of mixing can be any of those known in the art. Since the metal hydrocarbonoxide is already in an alcohol solution after preparation, the metal hydrocarbonoxide can be added to the room temperature vulcanizable silicone elastomer in this form.

The room temperature vulcanizable silicone elastomer compositions are prepared under anhydrous conditions and packaged in containers which keep moisture from acting on the composition. The compositions can therefore be stored for long periods of time in these containers without curing. When cure is desired, the composition is removed from the container, placed in its desired position and atmospheric moisture will induce curing. The properties of the cured product are not effected by the presence of the metal hydrocarbonoxides.

The best method of preparing the compositions of this invention is to mix the polydiorganosiloxane, metal hydrocarbonoxide and any filler on a rubber mill or other commercial mixer and thereafter mix into this composition the silicon compound (B) and the curing catalyst on a commercial mixer.

The room temperature vulcanizable silicone elastomers when applied to metal surfaces exhibit increased adhesion of the cured silicone elastomer to the metal surface compared to the same composition without the metal hydrocarbonoxide. The metal surfaces can be metals such as iron, steel, stainless steel, aluminum, titanium, copper, tin and alloys thereof.

The following examples are illustrative only and should not be construed as limiting the present invention which is properly delineated in the claims.

EXAMPLE 1

Ferric n-butoxide

In a one liter round bottom flask equipped with a stirrer and reflux condenser were placed 405 g. of n-butanol and 27.6 g. of sodium. The reaction mixture was heated until all the sodium had reacted and the resulting sodium n-butoxide solution was cooled to about 5° C. with an ice bath. To this solution 65.0 g. of anhydrous ferric chloride was added in portions with stirring. After all the ferric chloride had been added, the ice bath was removed and the stirring was continued for ten minutes. The by-produced sodium chloride was separated from the product, ferric n-butoxide, by centrifugation, the centrifugate being the product. No chloride ion was found by analysis and three drops of the product in 10 cc. of deionized water showed a pH of 5 to 6 using pH paper. The solution had an iron content of 4.08 percent.

Ferric ethoxide

Ferric ethoxide solution was prepared as described above for ferric n-butoxide using 237 g. of absolute ethanol, 13.8 g. of sodium and 32.5 g. of anhydrous ferric chloride. The centrifuged solution slowly deposited crystals on standing in accordance with description given by P.A. Thiessen and O. Koerner, in Zeit. Anorg. Chem., vol. 180, p. 65 (1929) where the solubility of ferric ethoxide at room temperature in ethanol is reported to be 3.2 to 3.8%. The solution before crystallization had an iron content of 2.4%. No chlorine ion was detected by analysis and three drops of the solution in 10 cc. of water showed a pH of 6 to 7 with pH paper.

Aluminum ethoxide

The aluminum ethoxide was used as purchased from a commercial source.

(A) A room temperature vulcanizable silicone elastomer composition was prepared by mixing on a rubber mill 100 parts by weight of a hydroxyl endblocked polydimethylsiloxane having a viscosity of 12,500 cs. at 25° C., 30 parts by weight of a fume silica filler having the surface treated with trimethylsiloxy groups and 3 parts by weight of the ferric ethoxide solution prepared above. After the composition was thoroughly mixed on the rubber mill, 10 parts by weight of a mixture of 50 weight percent methyltriacetoxysilane and 50 weight percent ethyltriacetoxysilane and 0.08 part by weight dibutyltin diacetate were added and mixed on a commercial mixer.

(B) A room temperature vulcanizable silicone elastomer composition was prepared as described in (A) above except in place of the ferric ethoxide solution, 1.5 parts by weight of solid aluminum ethoxide was used.

(C) A room temperature vulcanizable silicone elastomer composition was prepared by mixing on a rubber mill 100 parts by weight of a trimethoxysiloxy endblocked polydimethylsiloxane having a viscosity of 12,500 cs. at 25° C., 30 parts by weight of a fume silica filler having the surface treated with trimethylsiloxy groups and 3 parts by weight of the ferric ethoxide solution prepared above. After the composition was thoroughly mixed on the rubber mill, 4 parts by weight of methyltrimethoxysilane and 0.6 part by weight of tetrabutyltitanate were added and mixed on a commercial mixer.

(D) A room temperature vulcanizable silicone elastomer composition was prepared as described in (C) above except in place of the ferric ethoxide solution, 3 parts by weight of the ferric butoxide solution as prepared above was used.

(E) A room temperature vulcanizable silicone elastomer composition as prepared in (A) above except the ferric ethoxide solution was left out.

(F) A room temperature vulcanizable silicone elastomer composition as prepared in (C) above except the ferric ethoxide solution was left out.

The mechanical properties were measured at ambient laboratory conditions on samples pressed from 1/16 inch thick sheets of the cured room temperature vulcanizable silicone elastomer. The adhesion test specimens were prepared by applying beads of the room temperature vulcanizable silicone elastomer to aluminum panels previously cleaned by rubbing with paper wipes under trichloroethylene and then under methyl isobutyl ketone. Aluminum and steel foil strips (0.25 inch width by 0.004 inch thickness) similarly cleaned were pressed into the room temperature vulcanizable silicone elastomer beads and cured in chases maintaining the elastomer thickness at 1/8 inch. After the elastomer cured, the elastomer was cut to the panel on each side of the foil strip to obtain standard widths. The force required to peel the strips from the panel at 180° were measured. The tests were at ambient conditions with a jaw separation of two inches per minute.

The amount of cohesive failure was also observed. The results observed were as shown in Table I. The adhesion peel strengths were measured after one week's cure and were reported in pounds per linear inch, p.l.i.

TABLE I

| Elastomer | Durometer | Tensile strength at break, p.s.i. | Elongation at break, percent | Tear strength, p.p.i. | Peel strength | | | |
|---|---|---|---|---|---|---|---|---|
| | | | | | Aluminum | | Steel | |
| | | | | | P.l.i. | Percent cohesive failure | P.l.i. | Percent cohesive failure |
| A | 25 | 835 | 790 | 144 | 40 | 0 | 70 | 20 |
| B | 27 | 915 | 700 | 134 | 20 | 0 | 100 | 90 |
| C | 23 | 600 | 900 | 142 | 115 | 100 | 115 | 100 |
| D | 25 | 600 | 840 | 145 | 45 | 0 | 80 | 100 |
| E* | | | | | 10 | 0 | 10 | 0 |
| F* | | | | | 10 | 0 | 10 | 0 |

*For comparative purposes.

That which is claimed is:

1. A room temperature vulcanizable silicone elastomer composition stable in the absence of moisture but curable upon exposure to moisture consisting essentially of:
   (A) 100 parts by weight of a polydiorganosiloxane having a viscosity of from 1000 to 100,000 cs. at 25° C. and having endblocking selected from the group consisting of hydroxyls and siloxy units of the formula $R_nX_{3-n}SiO_{0.5}$ where R is selected from the group consisting of methyl, ethyl, 3,3,3-trifluoropropyl, vinyl and phenyl, X is selected from the group consisting of alkoxy radicals having 1 to 6 carbon atoms and acetoxy radicals, and $n$ is an integer of from 0 to 1 inclusive, the organic groups of the polydiorganosiloxane are the same as defined for R wherein at least 50 percent of the organic groups are methyl,
   (B) from 0.1 to 15 parts by weight of a silicon compound selected from the group consisting of:

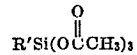

$R'Si(OR'')_3$, $Si(OR''')_4$, and partial hydrolyzates of $Si(OR''')_4$ where R' is selected from the group consisting of alkyl having from 1 to 6 carbon atoms, vinyl, 3,3,3-trifluoropropyl and phenyl, R'' is an alkyl having from 1 to 6 carbon atoms and R''' is an alkyl having from 2 to 6 carbon atoms, where

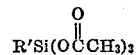

is used only when (A) has hydroxyl endblocking or X is acetoxy and where $R'Si(OR'')_3$, $Si(OR''')_4$ and partial hydrolyzates of $Si(OR''')_4$ is used when X is an alkoxy radical having 1 to 6 carbon atoms,
   (C) a curing catalyst for the composition, said catalyst being selected from the group consisting of metal salts of carboxylic acids, titanium esters, organosiloxytitanium compounds, amines, amine salts and quaternary amine salts, and
   (D) from 0.01 to 2 parts by weight inclusive metal in the form of a metal hydrocarbonoxide selected from the group consisting of $Fe(OR^{iv})_3$, $V(OR^v)_3$, $Co(OR^v)_2$, $MoO_2(OR^v)_2$, $Zn(OR^v)_2$, $Ce(OR^v)_3$ and Al(OCH$_2$CH$_3$)$_3$ wherein R$^{iv}$ is selected from the group consisting of ethyl, normal propyl, normal butyl and phenyl and R$^v$ is selected from the group consisting of ethyl, normal propyl and normal butyl.

2. The room temperature vulcanizable elastomer composition according to claim 1 wherein a filler is also present.

3. The room temperature vulcanizable silicone elastomer composition according to claim 1 wherein the metal is present in an amount of from 0.02 to 1 part by weight inclusive.

4. The room temperature vulcanizable silicon elastomer composition according to claim 1 wherein (A) is a hydroxyl endblocked polydiorganosiloxane, (B) is a mixture of methyltriacetoxysilane and ethyltriacetoxysilane, (C) is a tin salt of carboxylic acid.

5. The room temperature vulcanizable to silicone elastomer composition according to claim 4 wherein (D) is ferric ethoxide.

6. The room temperature vulcanizable silicone elastomer composition according to claim 4 wherein (D) is aluminum ethoxide.

7. The room temperature vulcanizable silicone elastomer composition according to claim 1 wherein (A) is a methyldimethoxysiloxy endblock polydiorganosiloxane, (B) is methyltrimethoxysilane and (C) is an alkyltitanate having alkyls of from 3 to 6 carbon atoms.

8. The room temperature vulcanizable silicone elastomer composition according to claim 7 wherein (D) is Fe(OR$^{iv}$)$_3$.

9. The room temperature vulcanizable silicone elastomer composition according to claim 1 wherein the metal hydrocarbonoxide is added in an alcohol solution where the alcohol has from 2 to 4 inclusive carbon atoms.

References Cited

UNITED STATES PATENTS 3,432,463   3/1969   Hittmair et al. _____ 260—46.5

FOREIGN PATENTS 128,461   1960   U.S.S.R. _____ 260—46.5 G

DONALD E. CZAJA, Primary Examiner

M. I. MARQUIS, Assistant Examiner

U.S. Cl. X.R.

117—135.1; 260—18 S, 37 SB